Patented June 13, 1939

2,162,297

UNITED STATES PATENT OFFICE 2,162,297

CUTTING COMPOUND

Alfred E. Dahlberg, Chicago, Ill.

No Drawing. Application March 22, 1937,
Serial No. 132,298

11 Claims. (Cl. 87—9)

My invention relates to cutting oils of the type sometimes referred to in the industry as "non-soluble oils", "cutting oils" and "straight cutting oils", that is, oils which do not depend upon a water content for their cooling action on cutting tools. I shall employ the term "straight cutting oils", or a term of like import, where I wish to identify this type of composition.

Cutting oils are usually considered to be of two general types, namely, straight cutting oils wherein water, if present at all, is found in only relatively small amounts and then only incidentally and in the form of dispersed, dissolved or discrete particles contained within the body of the oil; and soluble cutting oils wherein an oleaginous constituent is combined with water to produce an emulsion wherein water is present in substantial amounts and is the continuous phase, and wherein the water acts as a coolant while the oil acts as a lubricant. It is to the former type of oil that my present invention is directed and in so far as my prior Patent No. 1,881,173 is directed to straight cutting oils, my present invention is an improvement thereon.

The principal object of my present invention is the provision of an improved straight cutting oil. Another object is the provision of an improved cutting oil having included as an ingredient thereof materials which will function concomitantly to improve the cutting and cooling action of the oil as well as impart other improving properties and functions thereto. A further object is to improve the product of my prior Patent No. 1,881,173. Another object is the provision by an improved method of compounding a base for a cutting oil adapted for use in relatively small amounts to improve the action of any of the usual and well-known cutting oils of the straight cutting oil type.

In my prior patent identified hereinabove I disclose the use of ammonium oleate in a straight cutting oil, the oil portion of said oil comprising a mineral oil or an oil derived from fish, animal or vegetable sources or mixtures thereof such as saturated or unsaturated triglycerides.

I have now found that by several improvements and refinements, the nature of which will be described hereinbelow, I am able to secure still further advantages in cooling action, in increasing tool life and in producing an all around general improvement in the product of my prior patent.

One feature which I found of advantage is to saponify oleic acid to form the ammonium oleate as an incident to the preparation of a cutting oil base. To this end, a suitable commercial grade of oleic acid is first thoroughly dispersed or dissolved in a portion of mineral oil, the proportion of mineral oil generally being somewhat less in amount than the weight or volume of oleic acid employed. I then react the oleic acid with ammonia in a suitable way preferably by introducing a concentrated solution of ammonia water or ammonium hydroxide (28% NH₃). While substantially equal equivalents of oleic acid and ammonia may be employed so that substantially all of the oleic acid is saponified, I have found certain advantages in using somewhat less ammonia than sufficient to saponify all of the oleic acid. Very good results are obtained by using such proportions of oleic acid and ammonia that the resulting product is substantially neutral to litmus. Since ammonium oleate is a salt of a relatively strong alkali and relatively weak acid, the pure ammonium oleate is definitely alkaline. However, by superfatting the ammonium oleate in the manner described, a product may be produced which is substantially neutral to litmus and which contains roughly almost two equivalents of oleic acid to one equivalent of ammonium hydroxide.

In addition to using an excess of oleic acid as described hereinabove, I find that I also improve the properties of the cutting oil by incorporating in the base thereof a relatively large proportion of pine oil. The pine oil not only seems to facilitate the formation and dispersion of the ammonium oleate and promote better cooling action of the cutting oil, but it has a general all-around function in improving the product, an incidental advantage being that it has a strong antiseptic action.

According to one example of my invention, I produce a cutting oil base by mixing together two and one-half gallons of oleic acid (commercial grade), one and one-half gallons of a suitable mineral oil (a light paraffin oil) and one and one-half gallons of pine oil. These three oleaginous materials are mixed together thoroughly at room temperature and then forty fluid ounces of 28% commercial aqua ammonia is stirred in gradually. The ammonium oleate is formed substantially instantaneously as the ammonia water is introduced, and after all of it has been stirred in, stirring may be continued for a few minutes and the product is then ready for use as a cutting oil base, the exact manner of use being described hereinbelow.

The proportions employed in accordance with the above example may be modified somewhat, and accordingly I give hereinbelow an example by reference to parts by weight, which example may be used in either large or small batches. Substantially equal parts of mineral oil and pine oil are mixed together and then to this mixture is added a substantially equal part of a commercial grade of oleic acid. To sixteen parts of the mixture of the three oleaginous constituents is then added gradually with stirring one part of 28% aqua ammonia. This product is handled as the first described product and is suitable for use as a base adapted to be introduced into a suitable oleaginous product in a manner described hereinbelow to form a straight cutting oil.

It is by no means necessary that the oleic acid and ammonia be introduced separately although, as explained, the formation of the soap in situ is preferred. I may, for example, mix together substantially equal quantities of oleic acid and mineral oil and then into this mixture introduce approximately one-half part of previously formed ammonium oleate. I find that the presence of the oleic acid seems to facilitate somewhat the introduction of the ammonium oleate.

In addition to this method of procedure, I may also incorporate together substantially equal parts of pine oil, mineral oil, and oleic acid and then into this mixturee introduce with stirring approximately one-third part of previously formed ammonium oleate.

In each of the examples given above, I have employed a proportion of mineral oil in the cutting oil base and this is done primarily for the purpose of facilitating the introduction of the base into a larger body of oil as employed in contact with a tool. It should be borne in mind that in general I may produce the base itself without a content of mineral oil or without a content of pine oil, in each case, however, retaining the excess of oleic acid and a diluent of such a character as to facilitate the introduction of the cutting oil base into a bigger body of lubricant. For all practical purposes, however, the base is found to be improved by incorporating therein both a pine oil and a mineral oil as described in the first two illustrative examples given hereinabove.

My cutting oil base is adapted for use with any of the usual straight cutting oils now employed in the industry, such as oils of mineral, plant or animal origin, such as lard oil, kerosene and other mineral oils, sulfurized or unsulfurized, and treated with such other addition products as may be desired. The proportion of base with respect to straight oleaginous substance may vary, but I have found that, based upon the proportions given hereinabove, two to four per cent of the base added to the standard, straight cutting oil greatly improves the action of that oil, whatever its constitution and function was prior to the introduction of my improved base. For example, in a particular case where straight sulfurized oil was being employed and tools required frequent sharpening, I added two per cent of the base of my first example and increased the tool life approximately five-fold without making any other changes or adjustments in either the oil, the tools or the work. In another case, I found a condition where a ferrous material sought to be tooled was rejected as unworkable, notwithstanding the fact that the best known machines, tools and non-soluble cutting oils had been employed in attempting to machine the material in question. I found, however, that adding approximately three per cent of my cutting oil base to the straight cutting oil employed in this instance rendered an otherwise non-commercial operation fully commercial and saved the scrapping of relatively large amounts of material that would otherwise have been substantially unworkable.

The cutting oil base of my invention may be added to mineral oil, sulfurized or unsulfurized oils, to lard oils and other oils derived from mineral, plant, animal or fish sources, or in fact to any straight cutting oil however it may have been prepared; and in each case, whatever the treatment or constitution of that oil has been, I have found that distinct and remarkable improvements were obtained by the addition of a proportion of my cutting oil base.

It is, of course, obvious that I am not limited in the proportions of materials employed in the cutting oil as employed on a machine. In other words, in place of two to four per cent of the base, I may add to the cutting oil somewhat less than two per cent or considerably in excess of four per cent without departing from the spirit and scope of my invention. In general, I have found however, that the use of a proportion of the base materially less than two per cent begins to cut down the function of the ammonium oleate and other ingredients too greatly, and that the use of proportions greatly above four per cent in general does not improve the functions of the added ingredients sufficiently to warrant the added expense. Obviously, however, instances may and do arise where greatly increased proportions may be used while still operating within the teaching of my invention. I may say also that there may be times when it will be advisable to increase the proportion of mineral oil or other similar oleaginous material in the base, both for the purpose of improving the character of the base itself under certain circumstances and also facilitating the introduction of the base into certain types of straight cutting oils. Proportions of mineral oil with respect to ammonium oleate employed in the base, while generally not critical, may, under certain circumstances, be of importance.

In the use of the cutting oil of my invention, a final feature may be noted as important from a practical, commercial point of view. While certain features are fundamental and may apply in all instances, it nevertheless is known that each instance where a cutting oil is used is in a sense associated with specific conditions and problems. For example, in one case, two per cent of a base product made in accordance with my invention may be adequate to secure the best results possible; while in another instance three per cent of the base product may function much better than two per cent. In still another instance, a sulfurized oil used conjointly with my cutting oil base may give much better results than for example the use of lard oil with my cutting oil base; while in still another instance a relatively inexpensive lard oil or simple mineral oil or other oil may be more than adequately improved by the mere addition of a relatively small proportion of the base of my invention. My invention, therefore, may be practiced in such a way that a complete straight cutting oil ready to be used on, for example, an automatic screw machine may be given to the user. The sale of the base product, however, has the advantage that it can be combined in various proportions with various types of commonly employed straight cutting oils and, in this way, better results may be obtained in meeting specific problems as they arise.

What I claim as new and desire to protect by Letters Patent of the United States is:

1. A straight cutting oil comprising a substantially non-aqueous mixture containing a major proportion of an oil and minor proprtions of oleic acid and ammonium oleate.

2. A straight cutting oil comprising a substantially non-aqueous mixture containing a major proportion of a mineral oil and minor proportions of oleic acid and ammonium oleate.

3. A straight cutting oil comprising a substantially non-aqueous mixture containing a major proportion of a mineral oil and minor proportions of oleic acid, ammonium oleate and pine oil.

4. A straight cutting oil comprising a substantially non-aqueous mixture containing mineral oil and a relatively small proportion, based on the volume of said mineral oil, of a composition consisting primarily of an intimate admixture of the following ingredients in the following proportions by volume:

Four (4) parts mineral oil
Four (4) parts pine oil
Eight (8) parts oleic acid
One (1) part $NH_4OH$ (28% $NH_3$)

said oleic acid and $NH_4OH$ being combined to form a mixture of ammonium oleate and oleic acid.

5. A cutting compound in accordance with claim 4 wherein the composition constitutes between 2% and 10% by volume of the mineral oil.

6. A substantially non-aqueous base for straight cutting oil compositions containing oleic acid, ammonium oleate and an oil selected from the group consisting of animal, vegetable and mineral oils.

7. A substantially non-aqueous base for straight cutting oil compositions containing oleic acid, ammonium oleate, pine oil, and an oil selected from the group consisting of animal, vegetable and mineral oils.

8. A substantially non-aqueous base for straight cutting oil compositions containing the following ingredients in approximately the following proportions by volume:

Four (4) parts mineral oil.
Four (4) to six (6) parts ammonium oleate
Two (2) to four (4) parts oleic acid 9. A substantially non-aqueous base for straight cutting oil compositions containing an intimate admixture of the following ingredients in approximately the following proportions by volume:

Four (4) parts mineral oil
Four (4) parts pine oil
Eight (8) parts oleic acid
One (1) part $NH_4OH$ (28% $NH_3$)

said oleic acid and $NH_4OH$ being combined to form a mixture of ammonium oleate and oleic acid.

10. A straight cutting oil comprising a substantially non-aqueous mixture which contains on the order of 90% or more of a readily mobile oil, the remainder comprising oleic acid and ammonium oleate, said proportions being by volume.

11. A straight cutting oil comprising a substantially non-aqueous mixture which contains on the order of 90% or more of a readily mobile mineral oil, the remainder comprising oleic acid, ammonium oleate, and pine oil, said proportions being by volume.

ALFRED E. DAHLBERG.